United States Patent [19]

Fay

[11] 4,388,711

[45] Jun. 14, 1983

[54] OPTIMUM FLOW NOISE CANCELLING HYDROPHONE MODULE

[75] Inventor: John W. Fay, Old Lyme, Conn.

[73] Assignee: The United States of America as represented by the Secretary of the Navy, Washington, D.C.

[21] Appl. No.: 287,959

[22] Filed: Jul. 28, 1981

[51] Int. Cl.$^3$ .............................................. G01S 3/80
[52] U.S. Cl. ................................ 367/135; 367/20; 367/130; 367/901; 367/154
[58] Field of Search .................... 367/20, 21, 22, 23, 367/24, 106, 130, 135, 901, 154

[56] References Cited

U.S. PATENT DOCUMENTS

| | | | |
|---|---|---|---|
| 1,584,613 | 5/1926 | Comstock et al. | 367/154 |
| 2,368,953 | 2/1945 | Walsh | 367/901 X |
| 3,071,752 | 1/1963 | Strasberg | 367/135 |
| 3,281,767 | 10/1966 | Cryar | 367/20 |
| 3,299,397 | 1/1967 | Pavey, Jr. et al. | 367/24 |
| 3,436,722 | 4/1969 | Strange | 367/20 |
| 3,795,873 | 3/1974 | Fein et al. | 331/78 |
| 3,860,899 | 1/1975 | Watlington | 367/901 X |
| 3,922,488 | 11/1975 | Gabr | 179/1 HF |
| 4,025,724 | 5/1977 | Davidson, Jr. et al. | 179/1 P |
| 4,091,358 | 5/1978 | Bayhi | 367/20 |

Primary Examiner—Richard A. Farley
Attorney, Agent, or Firm—Robert F. Beers; Arthur A. McGill; Prithvi C. Lall

[57] ABSTRACT

An apparatus for rejection of turbulence induced flow noise for towed hydrophone arrays. Two adjacent hydrophones in the array are spaced less than flow noise coherence distance apart forming a flow noise cancelling module. The inverted acoustic/flow noise signal from the lead hydrophone of the pair is split, one side passing to the final stage of signal processing while the other side, filtered, amplified and inverted, is added to the combined signal from the lag hydrophone which has been filtered and amplified. The acoustic signal components cancel leaving only the lead hydrophone flow noise plus the lag hydrophone flow noise which has been shifted by a factor dependent upon tow vessel speed and hydrophone spacing. This flow noise signal is then combined in an adder-inverter with the delayed feedback from the output stage of this same adder-inverter, cancelling the lag hydrophone flow noise leaving only the flow noise of the lead hydrophone which is then combined with the acoustic signal plus flow noise output of the lead hydrophone. The flow noise components cancel yielding only the signal of interest, free of flow noise and undistorted by minor phase shifts.

5 Claims, 2 Drawing Figures

OPTIMUM FLOW NOISE CANCELLING HYDROPHONE MODULE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to flow noise reduction in towed line arrays and more particularly to an optimum flow noise cancelling hydrophone module which rejects turbulence induced flow noise while allowing acoustic signal to pass undisturbed at all relevant frequencies.

(2) Description of the Prior Art

The Navy is interested in detection and classification of low frequency, narrowband, noise emitting sources using high speed towed arrays. However, at high tow speeds the predominant low frequency noise is often flow related with levels which increase proportionally with speed. Typically the turbulence induced pressure fluctuations associated with the flow have wavenumbers, ($2\pi/\lambda$), that are much larger than acoustical wavenumbers. These large wavenumbers correspond to small wavelengths. Moreover, the distance over which the flow noise is correlated is on the order of inches. Therefore, in the usual array of acoustically spaced hydrophones, high wavenumber noise voltage is independent between hydrophones. The flow noise level and the sonar figure of merit degradation are therefore proportional to tow vessel speed. Summing of grouped hydrophones (clustering) spaced within the noise coherence distance has been the main method of rejecting flow type noise up until recently. A big advantage of clustering over alternatives is the electronic simplicity—a resistor summing network. However, clustering does not reject flow noise adequately at frequencies where the noise wavelength is greater than the cluster length. In contrast, a flow noise cancelling hydrophone module is a bit more complex electronically but cancels correlated flow noise over a broader range of frequencies using signal processing techniques.

The instant invention emphasizes optimal signal processing methods which make use of the correlatedness of flow noise to cancel it from hydrophones used in mobile passive towed arrays. Gains in signal-to-noise ratio in my flow noise cancelling hydrophone module, U.S. patent application Ser. No. 103,827, filed Dec. 7, 1979, adequately rejected turbulent flow noise but also cancelled signals at some frequencies. My new apparatus rejects turbulent flow noise while passing the acoustic signal undisturbed, at all relevant frequencies. Thus the gain in signal-to-noise ratio equals the amount, in dB, of the noise reduction.

SUMMARY OF THE INVENTION

An optimum flow noise cancelling module built according to the teachings of subject invention which rejects high wavenumber ($2\pi/\lambda$), coherent flow noise while passing the acoustic signal of interest undisturbed at all relevant frequencies. This module includes a pair of hydrophones, adjustably mounted, and spaced such that the lead hydrophone and the lag hydrophone are less than flow noise coherence distance apart. Acoustic signal components from each of the hydrophones are essentially identical owing to the close hydrophone spacing relative to the long wavelength of the acoustical signals. Such signals thus reach each hydrophone essentially simultaneously. These components cancel when the outputs of both hydrophones are combined leaving only a modified version of the flow noise components of the hydrophones. The modified flow noise components are then processed in such a way as to cancel the flow noise component from the combined lead hydrophone signal leaving only the acoustic signal of interest.

An object of subject invention is to have a flow noise reducing device which optimally reduces high wavenumber coherent flow noise over all relevant frequencies.

Another object of subject invention is to have an apparatus for reducing self-induced flow noise in an array where a module of two closely spaced hydrophones is substituted for each single hydrophone in the towed array.

Other objects, advantages and novel features of this invention will become apparent from the following detailed description of the invention when considered in conjunction with the accompanying drawings herein.

DESCRIPTION OF THE PREFERRED EMBODIMENT

Figure 1:
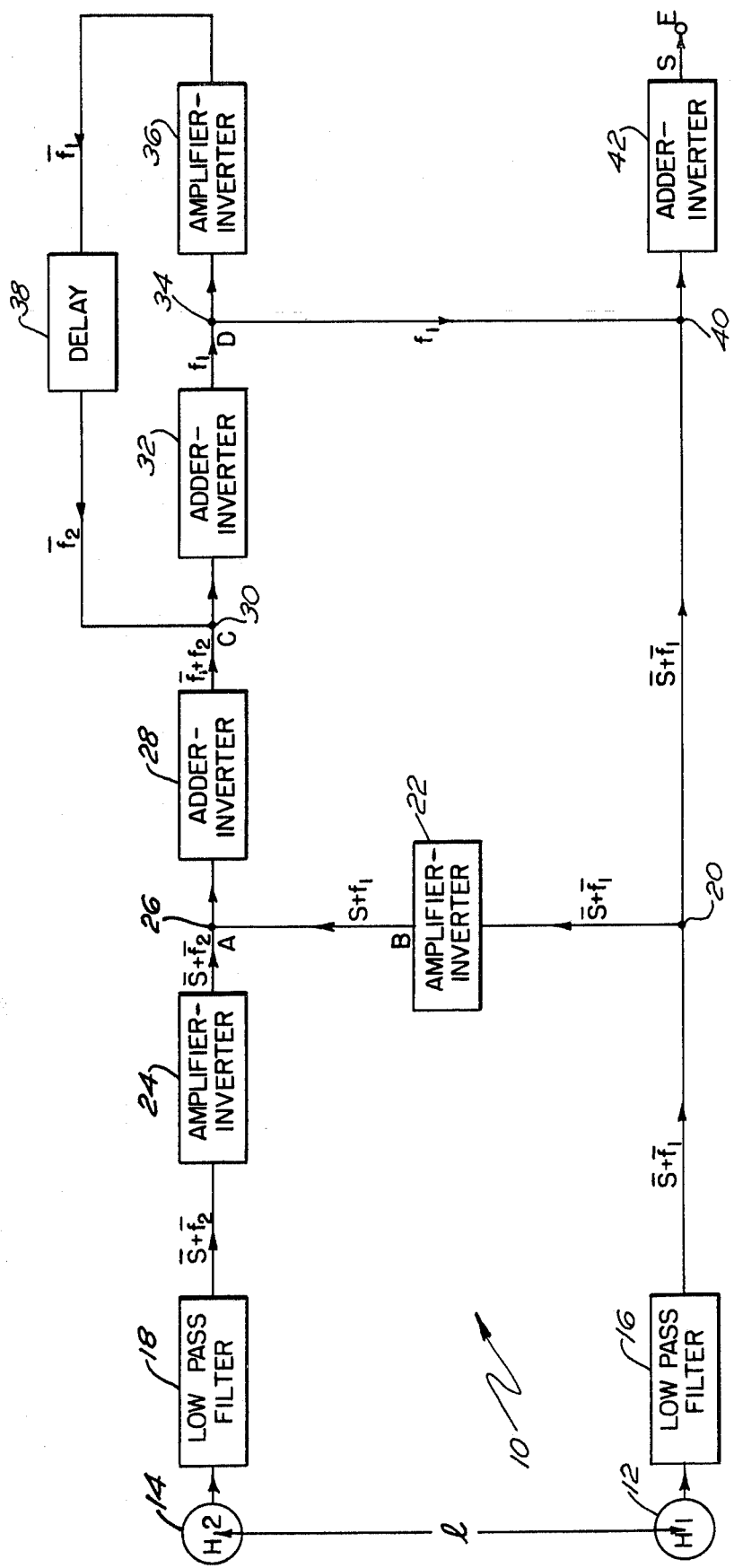
FIG. 1 shows a block diagram of an optimum flow noise cancelling hydrophone module in accordance with the teachings of subject invention.

The purpose of this module is to reject correlated turbulence induced flow noise predominant at low frequencies in the output of a single hydrophone in a high speed towed array. Successful rejection of such noise depends upon recognition of relationships between tow vessel speed, $V_K$ and the spacing (l) between the lead hydrophone and the lag hydrophone. This tow speed dependence of the flow noise is a key distinguishing characteristic of this approach. Spacing l must be reasonably less than the flow noise coherence distance. Flow noise waveforms may be represented as:

$$N_f = K_N e^{-i2\pi f_N t}$$

where $N_f$ is a simplified single frequency representation for high wavenumber turbulent noise. Similarly, $$S = K_S e^{-i2\pi f_S t}$$

where S is a simplified single frequency representation for acoustical wavefronts from targets and ambient noise. Subscripted frequencies serve to identify the component waveforms. In general, acoustical and nonacoustical disturbances have the same frequency components, i.e., $f_N = f_S$. $K_N$ and $K_S$ are voltage magnitudes for the noise and signal respectively at a single frequency. It should be noted that although described for single frequency waveforms, the technique is generally broadband.

The lead hydrophone voltage is filtered and inverted to obtain $V_B = N_f + S$. The lag hydrophone voltage is filtered and twice inverted to obtain $$V_A = -N_l[e^{-i2\pi f_N l/0.8V_K}] - S[e^{-i2\pi l f_S/V_S}]$$

where $0.8V_K$ is the typical convective travel speed of the pressure fluctuations due to turbulence. This speed is the ratio of the hydrophone separation l to the phase delay of the flow noise pressure fluctuations between hydrophones. Hydrophone waveforms are added through the OP AMP between A and C resulting in an output at C of $$V_C = K_S e^{-i2\pi f S^t}[-1 + e^{-i2\pi f_S l/V_S}] + K_N e^{-i2\pi f_N t}[-1 + e^{-i2\pi f_N l/0.8V_K}]$$

Because $f_S l/V_S$ is on the order of $10^{-4}$, $e^{-i2\pi f_S l/V_S}$ is essentially one and the voltage into the OP AMP input at C is modified flow noise voltage $$V_C K_N e^{-i2\pi f_N t}[-1 + e^{-i2\pi l f_N/0.8V_K}].$$

Thus the flow noise voltage of the lead hydrophone appears at point C modified by the complex scalar $[-1 + e^{-i2\pi l f_N/0.8V_K}]$. Note the dependence on hydrophone separation, l, and tow vessel speed, $V_K$. The voltage at point D is given by $V_D = K_N e^{-i2\pi f_N t}$ since the closed loop delay path between points C and D has a response function given by $[-1 + e^{-i2\pi l f_N/0.8V_K}]^{-1}$ thus providing the required phase shift of $2\pi l f_N/0.8V_K$. The resulting voltage at point E is therefore $$V_E = K_S e^{-i2\pi f S^t} + K_N e^{-i2\pi f_N t} - K_N e^{-i2\pi f_N t}$$

giving, $$V_E = K_S e^{-i2\pi f S^t}.$$

Thus only acoustic signal S appears at point E. Note that the delay depends on tow vessel speed, $V_K$ and hydrophone separation, l. The module therefore processes voltages from two hydrophones, each of which contain both signal and noise, to produce an effective single hydrophone output which contains only the undistorted signal. The key points are that the module output is essentially the acoustic signal seen by the lead hydrophone. The delay between C and D is speed dependent such that the delay magnitude and phase are changed with changes in tow vessel speed, i.e., it is wavenumber $(2\pi/\lambda)$ dependent.

Referring now to FIG. 1, there is shown a block diagram of an apparatus built according to the teachings of subject invention. Optimum flow noise cancelling module 10 includes a lead hydrophone 12 and a lag hydrophone 14 spaced within flow noise coherence distance, l, apart. Acoustic signal, S, and flow noise, f, from each of hydrophones 12 and 14 pass through low pass filters 16 and 18 respectively emerging as $\overline{S+f_1}$ and $\overline{S+f_2}$, respectively. The filtered signal from hydrophone 12 is split at junction 20, one leg entering amplifier-inverter 22 and emerging as inverted signal $S+f_1$. The filtered signal from hydrophone 14 enters amplifier-inverter 24, emerging as $\overline{S+f_2}$. $S+f_1$ and $\overline{S+f_2}$ are then combined in adder-inverter 28 where S and $\overline{S}$ cancel resulting in the formation of combined flow noise signal $\overline{f_1+f_2}$. Signal $\overline{f_1+f_2}$ is then combined with feedback signal $\overline{f_2}$ in adder-inverter 32 cancelling $f_2$ leaving only flow noise signal $f_1$. Signal $f_1$ is then split at junction 34, one leg passing through amplifier-inverter 36, emerging as signal $\overline{f_1}$ which in turn passes through delay 38, emerging as the flow noise feedback signal $\overline{f_2}$ appearing at junction 30. The other leg of signal $f_1$ out of junction 34 is combined in adder-inverter 42 with the other leg of signal $\overline{S+f_1}$ from junction 20. The flow noise component cancels leaving only the acoustic signal from the lead hydrophone as the output of the module.

Figure 2:
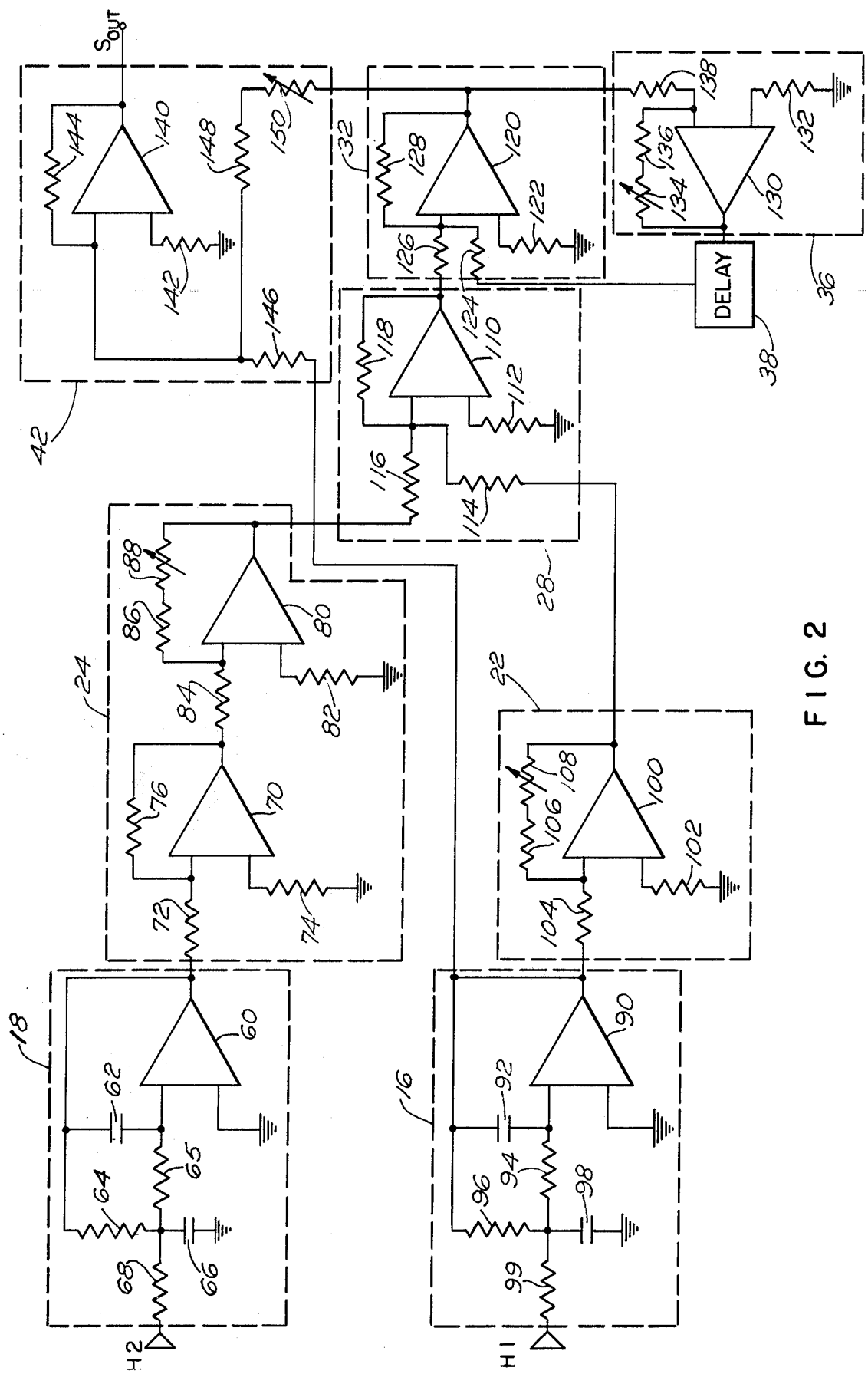
FIG. 2 shows a schematic diagram of the optimum flow noise cancelling hydrophone circuit module of subject invention.

FIG. 2 shows a schematic circuit diagram of one embodiment of subject invention.

Filter 18 comprises an operational amplifier, OP AMP 60, having interconnecting resistors 64, 65 and 68, and capacitors 62 and 66. Filter 18 receives a combined acoustic signal plus flow noise modified voltage from lag hydrophone, H2, then filters and amplifies this combined voltage before transmitting the processed signal to amplifier-inverter 24.

Amplifier-inverter 24 comprises OP AMP's 70 and 80. OP AMP 70 has associated therewith interconnecting resistors 72, 74 and 76. OP AMP 80 has associated therewith resistors 82, 84 and 86, and variable resistor 88. Within amplifier-inverter 24, OP AMP 70 receives the combined voltage output from filter 18, amplifies and inverts it before transmitting it to OP AMP 80 which inverts the voltage back to its original form, before transmitting it to adder-inverter 28.

Filter 16 comprises OP AMP 90 having interconnecting resistors 94, 96 and 99, and capacitors 92 and 98. Filter 16 receives a combined acoustic signal plus flow noise modified voltage from lead hydrophone, H1, then filters and amplifies this combined voltage before transmitting the processed signal to amplifier-inverter 22.

Amplifier-inverter 22 comprises OP AMP 100 having interconnecting resistors 102, 104 and 106, and variable resistor 108. Within amplifier-inverter 22, OP AMP 100 receives the voltage output from filter 16 and amplifies and inverts it before transmitting it to adder-inverter 28.

Adder-inverter 28 comprises OP AMP 110 having interconnecting resistors 112, 114, 116 and 118. Within adder-inverter 28, the voltage outputs from amplifier-inverters 22 and 24 are combined (cancelling the acoustic signal portion), amplified and inverted before being transmitted to adder-inverter 32.

Adder-inverter 32 comprises OP AMP 120 having interconnecting resistors 122, 124, 126 and 128. OP AMP 120 receives the combined flow noise voltage output from adder-inverter 28, cancels the flow noise signal component from the lag hydrophone and inverts the remaining voltage which then represents the flow noise voltage from the lead hydrophone. This flow noise voltage is then transmitted to amplifier-inverter 36.

Amplifier-inverter 36 comprises OP AMP 130 having interconnecting resistors 132, 136 and 138, and variable resistor 134. OP AMP 130 receives the voltage output from adder-inverter 32 and inverts the voltage before transmitting it to delay 38.

Delay 38 receives the inverted flow noise voltage output of the lead hydrophone from amplifier-inverter 36 and produces a phase shift equivalent to $2\pi l f_N/0.8V_K$ thereby converting the inverted flow noise voltage of the lead hydrophone to the inverted flow noise voltage of the lag hydrophone. The latter inverted flow noise voltage is then transmitted as a feedback to adder-inverter 32 where it cancels the flow noise voltage component of the flow noise voltage output from adder-inverter 28.

Adder-inverter 42 comprises OP AMP 140 having interconnecting resistors 142, 144, 146 and 148, and variable resistor 150. Within adder-inverter 42, OP AMP 140 receives the inverted, combined acoustic signal plus flow noise voltage output of filter 16 and the flow noise voltage output of adder-inverter 32. The flow noise cancels and the amplified output of OP AMP 140 has remaining only the acoustic signal component S from the lead hydrophone.

It is to be noted that the components used in this apparatus are of conventional type and any appropriate commercially available components can be used without deviating from the teachings of subject invention.

What has been described is an apparatus for optimal rejection of coherent, high wavenumber, turbulence induced, flow noise for mobile passive towed arrays. The distance between two adjacent hydrophones in the array is selected to be less than flow noise coherence distance apart, which pair forms a flow noise cancelling module. The inverted acoustic/flow noise signal from the lead hydrophone of the pair is split, one side passing to the final stage of signal processing while the other side, properly filtered, amplified and inverted, is added to the combined signal from the lag hydrophone which has been filtered and amplified, whereupon the acoustic components cancel leaving only the combined, inverted flow noise components. This combined signal comprises the lead hydrophone flow noise plus the flow noise received by the lag hydrophone which has been shifted by a factor dependent upon vessel speed and adjacent hydrophone spacing. The combined flow noise signal is further passed through an adder-inverter being combined therein with the properly delayed feedback from the output stage of this adder-inverter to produce an output signal which represents only the flow noise component of the lead hydrophone. This lead hydrophone flow noise signal is then combined with the inverted acoustic/flow noise output of lead hydrophone. The flow noise components cancel yielding only the signal of interest, free of flow noise and undistorted by minor phase shifts, thereby increasing the signal-to-noise ratio in an optimum fashion.

Obviously, many modifications and variations of the present invention are possible in light of the above teachings. For example, all the hardware components such as the filtering circuits, amplifiers and the delay line are of conventional type and can be changed without deviating from the teachings of subject invention. This includes components to correct for channel and gain mismatches. The speed dependent filter can be realized in a variety of ways which include analog and digital implementations. The invention can be either fixed or adaptive wherein filter characteristics change automatically with speed or waveform statistics. Although only two hydrophones have been shown, any number of hydrophones greater than two may be used with the choice of implementation made on the basis of cost effectiveness. It is therefore understood that within the scope of the appended claims the invention may be practiced otherwise than specifcally described.

I claim:

1. An optimum flow noise cancelling hydrophone module of a towed line array comprising:

a pair of hydrophones, a lead hydrophone and a lag hydrophone adjustably positioned adjacent one another in said towed line array;

a first filtering means for filtering the acoustic signal plus flow noise output of said lead hydrophone;

a second filtering means for filtering the acoustic signal plus flow noise output of said lag hydrophone;

a first amplifying means for amplifying and inverting the acoustic signal plus flow noise output of said first filtering means;

a second amplifying means for amplifying and twice inverting the acoustic signal plus flow noise output of said second filtering means;

a first summing means for adding the acoustic signal plus flow noise outputs of said first and said second amplifying means wherein said acoustic signals cancel leaving combined flow noise, then inverted, as the output of said first summing means;

delay loop means for cancelling said lag hydrophone flow noise component of said combined flow noise output of said first summing means and inverting said lead hydrophone flow noise then remaining; and a second summing means for adding and inverting said acoustic signal plus flow noise output of said first filtering means and said lead hydrophone flow noise component output of said delay loop means to obtain, as the output of said second summing means, the desired acoustic signal.

2. An optimum flow noise cancelling hydrophone module according to claim 1 wherein said delay loop means comprises:

delay means for phase shifting said inverted lead hydrophone flow noise to produce as the output thereof an inverted lag hydrophone flow noise;

a third summing means for adding said combined flow noise output of said first summing means and said inverted lag hydrophone flow noise output of said delay means producing said lead hydrophone flow noise; and a third amplifying means for amplifying and inverting said lead hydrophone flow noise output of said third summing means.

3. An optimum flow noise cancelling hydrophone module according to claim 2 wherein said delay means is adjustable for introducing an amount of delay proportional to ship's speed in said delay means output.

4. An optimum flow noise cancelling hydrophone module according to claim 3 wherein the distance between said lead hydrophone and said lag hydrophone is adjusted to be less than the coherence distance of said flow noise apart.

5. An optimum flow noise cancelling hydrophone module according to claim 4 wherein said first and second filtering means, said first, second and third amplifying means, said first, second and third summing means and said delay means each comprise an operational amplifier circuit with associated components.

* * * * *